United States Patent [19]

Pulido et al.

[11] Patent Number: 6,064,006
[45] Date of Patent: May 16, 2000

[54] CABLE CLOSURE INJECTION SEALED WITH ORGANOBORANE AMINE COMPLEX

[75] Inventors: Jacqueline J. Pulido; Kenneth D. Rebers; Thomas S. Croft, all of Austin, Tex.; Alan J. Oshinski, Kingsport, Tenn.; Kwang H. Chu; Daniel G. Lee, both of Austin, Tex.; Russell P. Smith, Georgetown, Tex.

[73] Assignee: 3M Innovative Properties Company, St. Paul, Minn.

[21] Appl. No.: 09/267,445

[22] Filed: Mar. 12, 1999

Related U.S. Application Data

[63] Continuation of application No. 08/784,485, Jan. 17, 1997, Pat. No. 5,912,433.

[51] Int. Cl.[7] ............................. H02G 15/02; H01R 4/00
[52] U.S. Cl. ............................. 174/77 R; 174/92; 174/93
[58] Field of Search ........................... 174/93, 92, 77 R, 174/74 R, 74 A, 88 R; 29/757

[56] References Cited

U.S. PATENT DOCUMENTS

| | | | |
|---|---|---|---|
| 2,792,441 | 5/1957 | Platow | 174/23 R |
| 2,967,795 | 1/1961 | Bollmeier et al. | 174/84 R |
| 3,215,761 | 11/1965 | Gelpey | 264/139 |
| 3,290,194 | 12/1966 | Gillemot | 156/48 |
| 3,427,393 | 2/1969 | Masterson | 174/23 R |
| 3,836,694 | 9/1974 | Kapell | 174/22 |
| 3,903,595 | 9/1975 | Takada et al. | 29/628 |
| 4,287,386 | 9/1981 | Scahill et al. | 174/76 |
| 4,332,975 | 6/1982 | Dienes | 174/76 |
| 4,387,268 | 6/1983 | Morel et al. | 174/92 |
| 4,444,996 | 4/1984 | Robertson | 174/74 A |
| 4,492,816 | 1/1985 | Morel et al. | 174/92 |
| 4,607,469 | 8/1986 | Harrison | 52/220 |
| 4,822,434 | 4/1989 | Sawaki et al. | 156/48 |
| 5,124,507 | 6/1992 | Dehling | 174/92 |
| 5,258,578 | 11/1993 | Smith et al. | 174/93 |
| 5,302,779 | 4/1994 | Morel et al. | 174/92 |
| 5,396,033 | 3/1995 | Piriz et al. | 174/94 R |
| 5,539,070 | 7/1996 | Zharov et al. | 526/198 |

*Primary Examiner*—Kristine Kincaid
*Assistant Examiner*—William H. Mayo, III
*Attorney, Agent, or Firm*—John A. Fortkort

[57] ABSTRACT

An end seal for a cable splice closure includes a core portion having a slot for receiving a cable. A tail portion, extending from the core portion, is of sufficient length and flexibility to be extended over the slot. An adhesive injection port is provided in the core portion to communicate an adhesive injected into the injection port to the slot to bond into a sealed unit the surfaces of the end seal and the cable to be received. The adhesive is a low surface energy adhesive based on acrylic monomers with organoborane amine complexes.

8 Claims, 10 Drawing Sheets

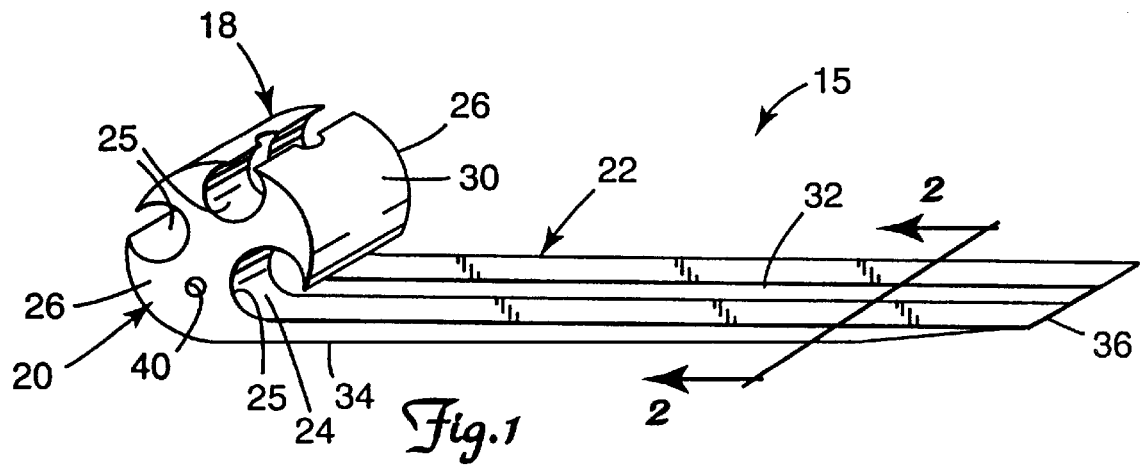
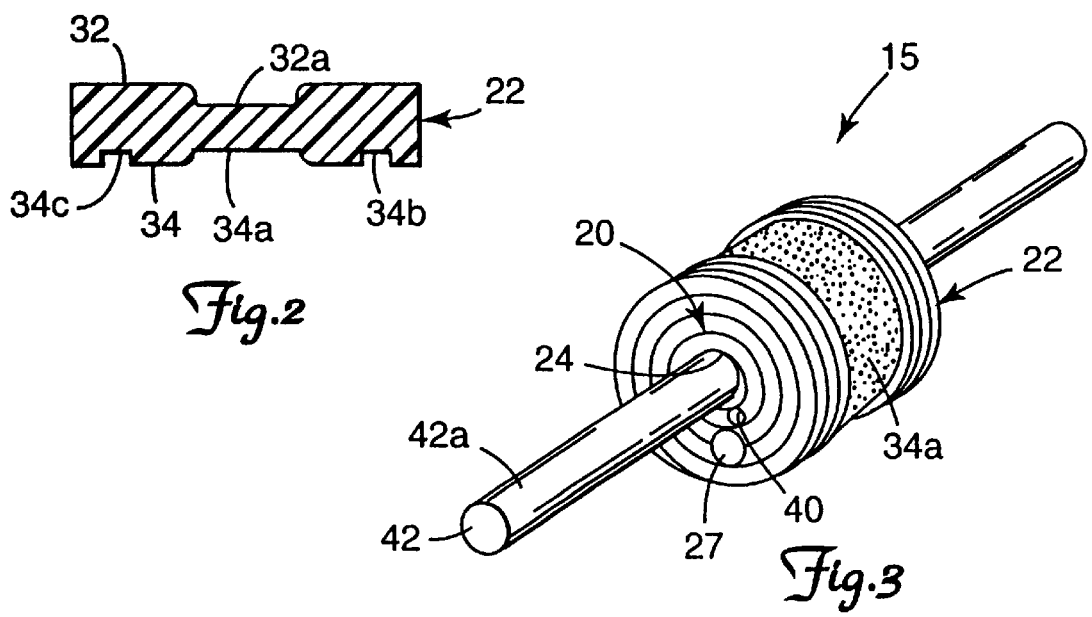
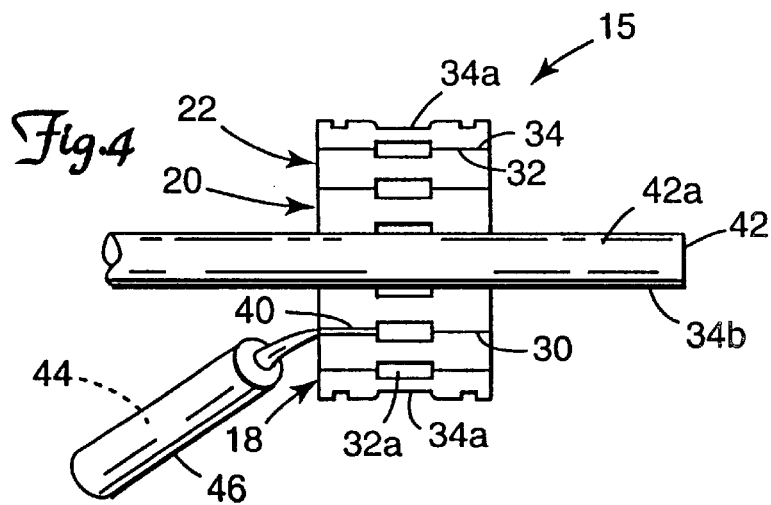

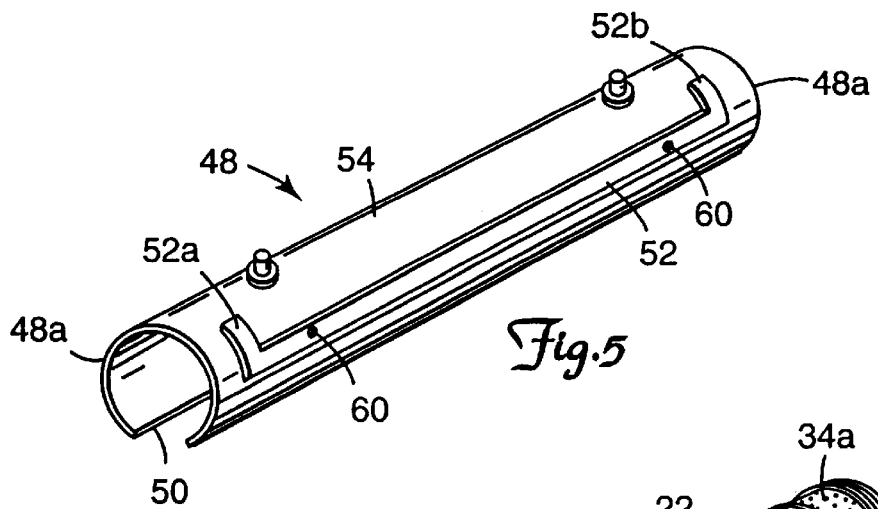
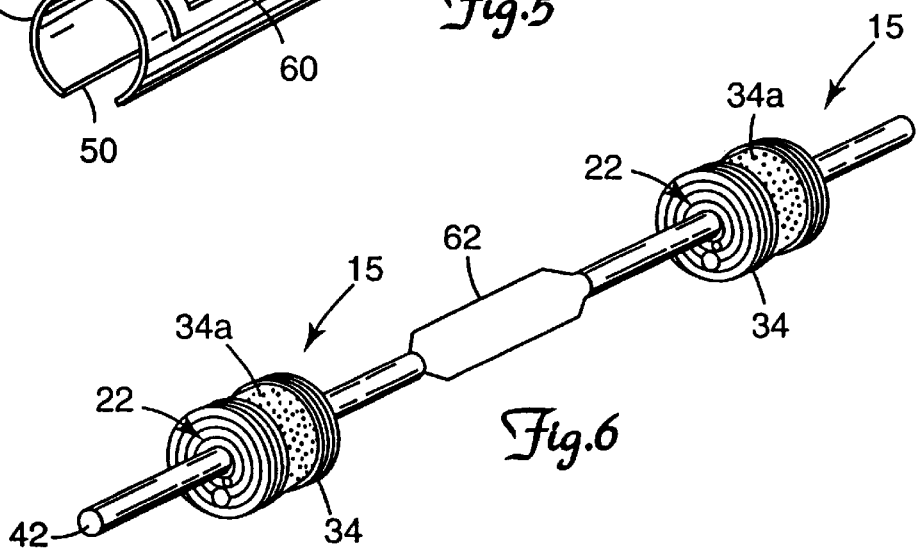
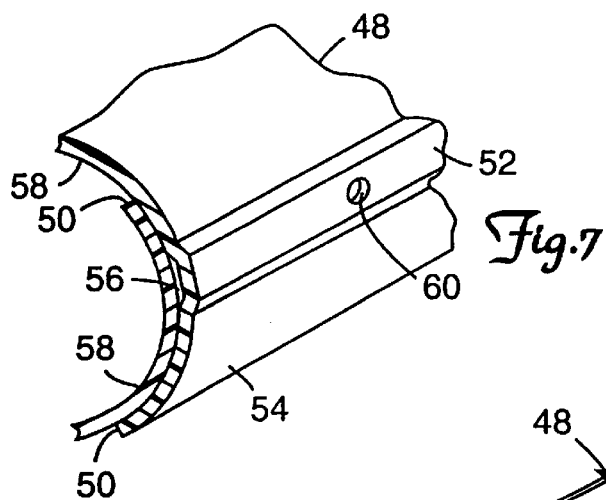
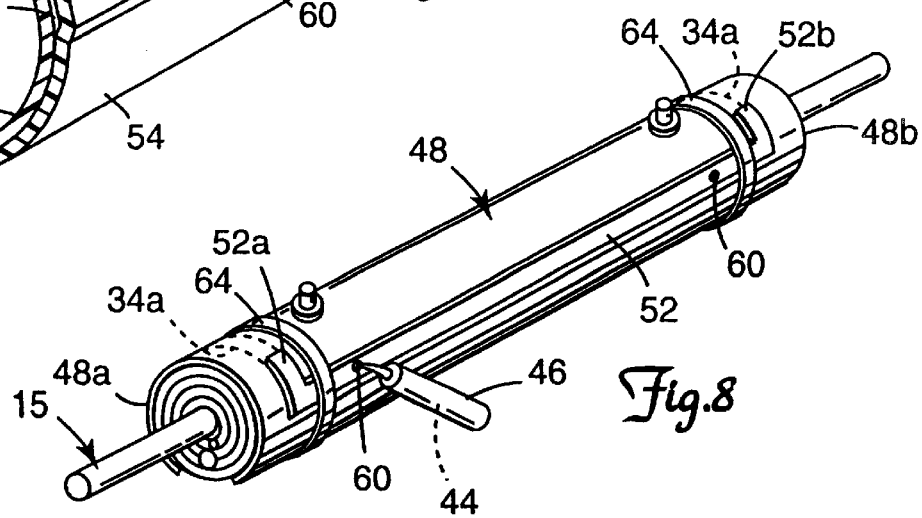

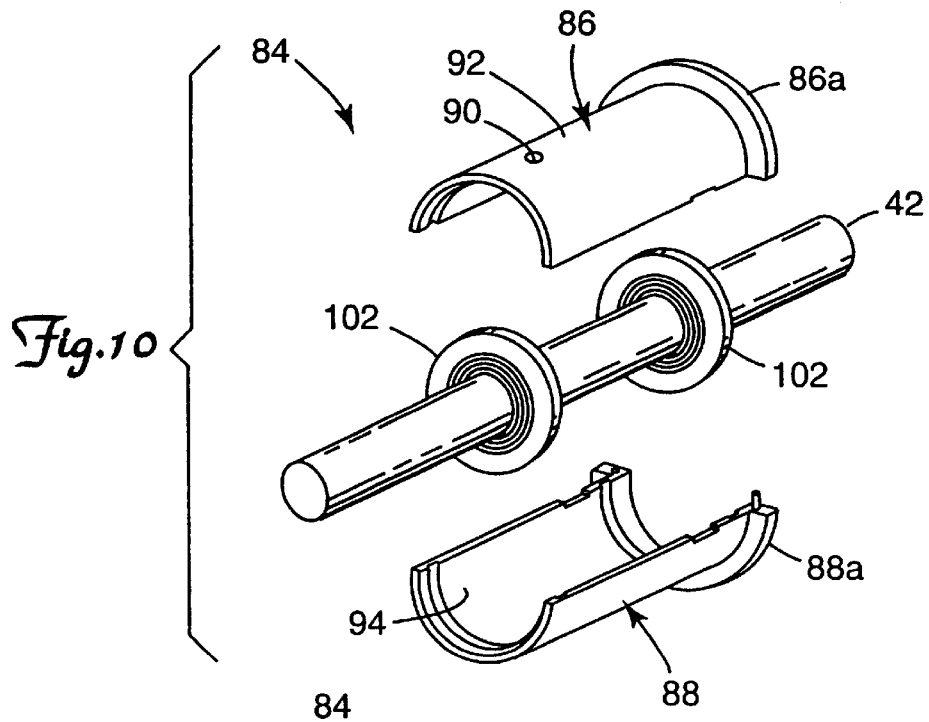
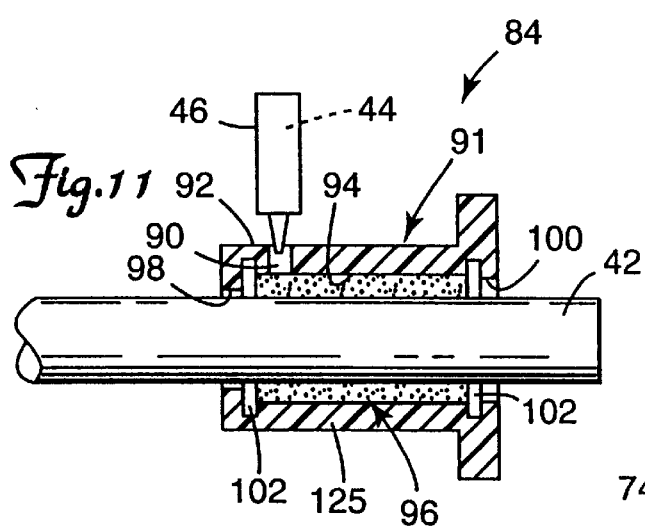
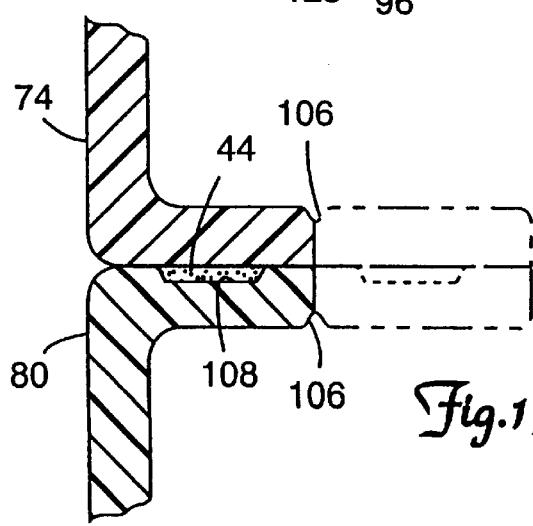
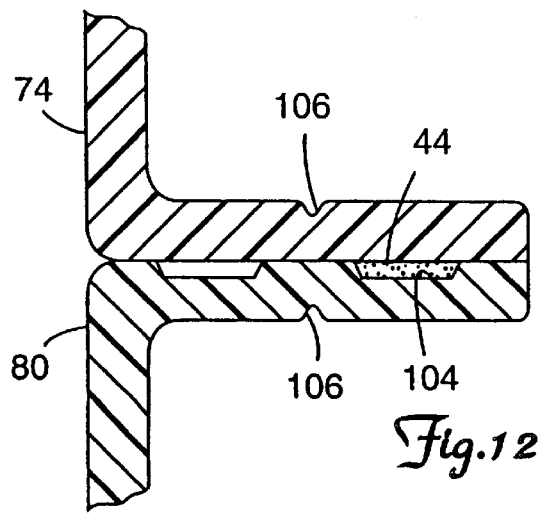

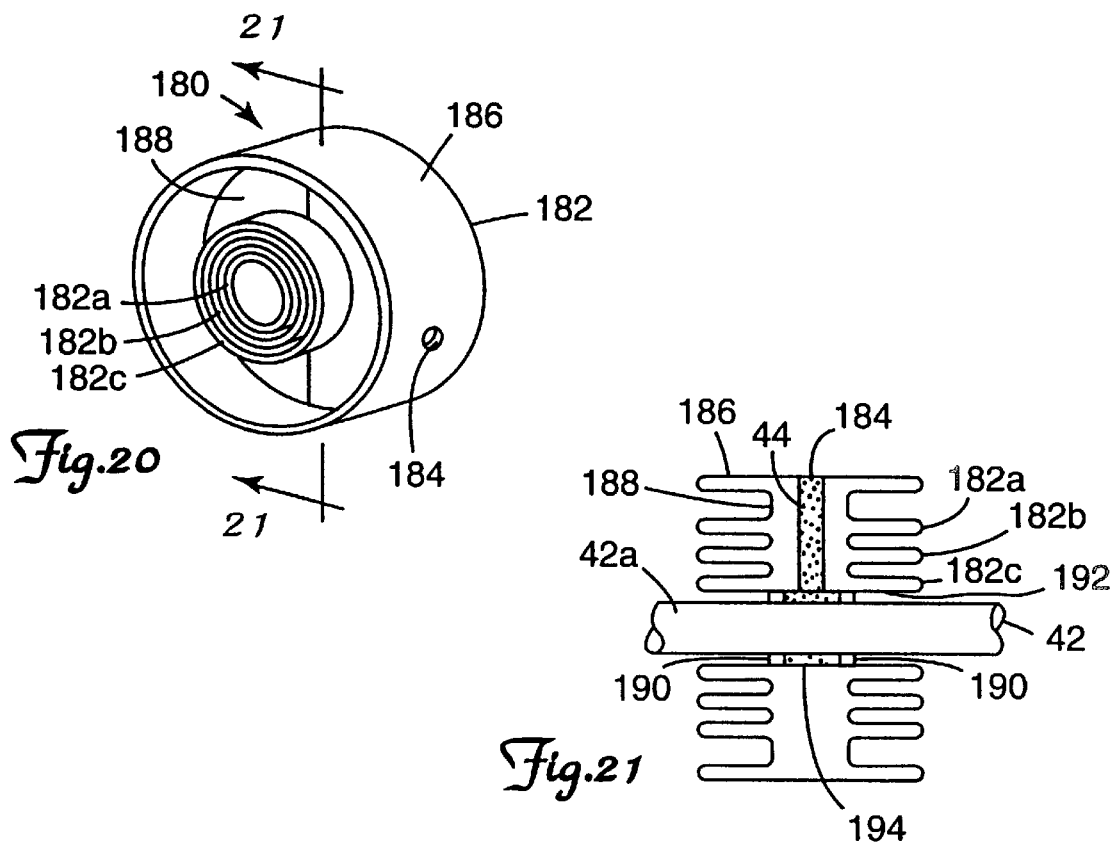
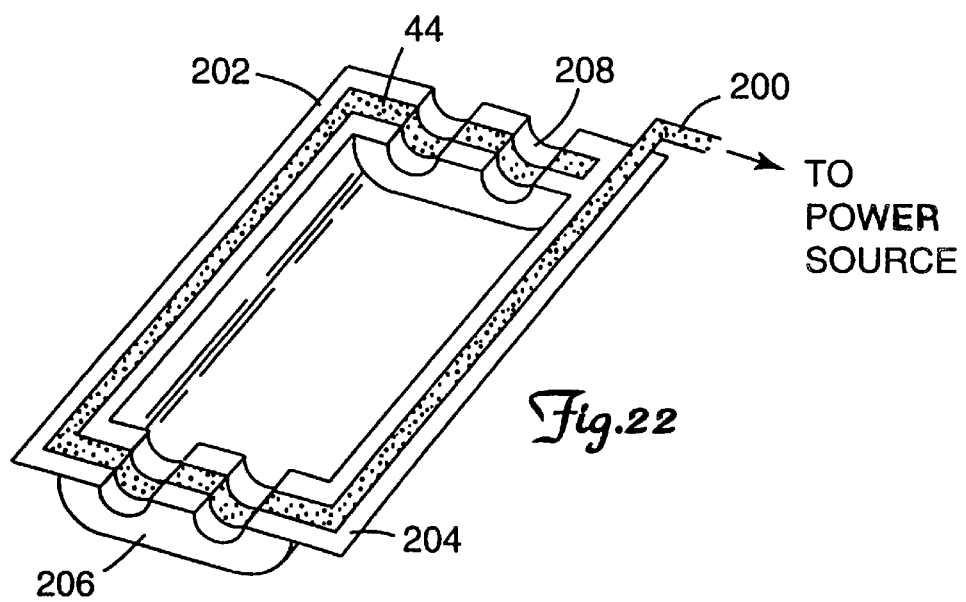

CABLE CLOSURE INJECTION SEALED WITH ORGANOBORANE AMINE COMPLEX

This is a continuation of application Ser. No. 08/784,485 filed Jan. 17, 1997 now parented as U.S. Pat. No. 5,912,433 on Jun. 15, 1999.

BACKGROUND OF THE INVENTION

The present invention relates generally to sealing a cable splice closure with a low surface energy adhesive and more particularly to injecting the adhesive into end seals used with such closures.

There are various methods for joining or splicing communication cable ends together. In so doing, there are many important considerations such as the use of compatible materials, how many cables are being spliced, is the spliced cable to be buried in soil, immersed in water or suspended in the air, what heat source is required to make the joint, i.e., flammable gasses, will the splice need to be reopened and remade without interruption of working circuits, will the joint have sufficient mechanical strength and is the cost feasible?

Communication cables are typically constructed of a conductor bundle, surrounded by a metal strength and interference sheathing and an outer protective coating, typically of a low surface energy material such as polyethylene. When such cables are spliced and rejoined, the strength and integrity of the rejoined cable is critical. An enclosure or a closure body is used to sealingly surround the splice. The closure body is also typically formed of a low surface energy material.

One persistent problem in the use of splice closures involves the need for a complete seal about the splice or closure body. Many prior art splice closures accomplish sealing by providing a complex array of nuts and bolts, clamps, gaskets and heat shrink tubing, as well as potting gels and resins, in various combinations. Besides the fact that these closure methods require significant assembly time, the closures still often suffer leaks or ruptures, particularly along their seals. This problem is even more acute at the end seal where the closure is sealed to the cable jacket, and where even the slightest defect can result in the migration of moisture along the jacket or the inner surface of the closure. A lack of a complete (hermetic) seal can also be particularly detrimental for pressurized closures. Occasionally, these closures must be re-entered and re-spliced. Typically, however, re-entry into a closure requires disturbing the end seal which is sealed to the cable and the closure. Therefore, re-sealing after re-entry becomes an acute problem.

Although these seals may be strengthened by the use of adhesives, the adhesive bonds formed are normally weak due to the low surface energy of the material of the closure, the end seals and cables, typically polyethylene. End seals can be used with a fusion bond and with hot melts as an alternative bonding material. Hot melt is placed between the resistance wires, and the wires are heated to form a bond between the cables and the end seal surfaces. Hot melt bonding can be used with different end seal materials such as foams, elastomers and thermoplastics, but the bond strength is weaker than a fusion bond seal.

Adhesive bonding or the achievement of adhesion of coatings to low surface energy polymeric materials has been a technological problem since the inception of the use of such materials in industry. There are many descriptions of the problems with the adhesive bonding of low energy surfaces. The difficulty with adhesive bonding of such materials stems, in part, from the fact that these materials are deemed to be "van der Waals" solids. That is, the primary force for cohesion that is available between polymer chains is that due to van der Waals or "dispersion" forces. Low surface energy materials derive their strength from molecular entanglements, cross-linking, crystallization or some combination of these. The surface energy of a polymer is a reflection of the forces which hold the chains together and is therefore low for these materials. Examples of low surface energy polymers are polytetrafluoroethylene, polyethylene, polypropylene, silicones, etc.

One criterion for adhesive bonding is that the adhesive must come into intimate contact with the substrate. That is, the adhesive must completely "wet" the substrate. Low surface energy polymers are very difficult to wet by polar liquids because the polar liquids have a surface energy that is higher than that of the substrate. Most high strength adhesives are polar materials and hence their surface energy is too high to wet the surface of most polymers. If the surface is incompletely wet by an adhesive, there is a greater chance for interfacial voids and hence a weaker bond.

Another criterion for adhesive bonding is that the surface must be free of weak boundary layers. Commercial plastics usually contain a substantial amount of additives such as stabilizers and flow control agents. Also, with free radically polymerized materials, there is also a substantial fraction of low molecular weight polymer in addition to the high molecular weight portion. In general, these low molecular weight fractions exude to the surface and form weak boundary layers. These layers must be removed before the plastic can be effectively bonded or coated.

There is a substantial science and technology developed around the surface preparation of low surface energy plastics for adhesive bonding or coating. The methods which have been developed include flame treatment, corona discharge treatment, plasma treatment, oxidation by ozone, oxidation by oxidizing acids, sputter etching as well as coating with higher surface energy materials. This last method is also known as "priming" and may have to be preceded by one of the physical methods (e.g., corona discharge treatment) in order to have the primer adhere well to the surface.

In general, the surface preparation methods described above act to increase the surface energy of the polymer and/or eliminate weak boundary layers and may also increase surface roughness. The surface energy of these plastics is usually increased by the introduction of oxidized species into the surface. The elimination of weak boundary layers may take place by crosslinking and/or ablation of the exuded species. There is usually a trade-off between the oxidation process and the weak boundary layers removal process since over-oxidized materials may themselves form a weak boundary layer.

Very few of the methods described in the literature are useful for a wide range of plastics. In general, the treatment method or the priming means is usually quite specific for the type of plastic used. This is a severe limitation for the general user of adhesive bonding since many of the physical methods of surface treatment require substantial capital investment. Thus, there is a need for a simple, easy to use adhesive bonding method that is capable of adhering, without priming, to a wide range of plastics including those classed as "low surface energy" plastics.

An efficient, effective means for adhesively bonding low surface energy plastic substrates such as polyethylene and polypropylene has long been sought for the assembly and repair cable splice closures. Typically, such assembly and repair is performed in the field. Consequently, there has been a considerable and long felt need for a simple, easy to use adhesive that can readily and effectively bond mating cable splice closure surfaces together as well as bonding communication cables to the end seals and bonding the end seals to the closure.

While an adhesive that can bond low surface energy plastics is advantageous, the commercial utility of such an adhesive would be enhanced if the components of the adhesive were combined in a convenient mix ratio and could be easily carried to a job site and readily applied using conventional adhesive dispensers without the need for laborious premixing of the various components of the adhesive. Thus, there is not only a need for an adhesive that can bond low surface energy plastics, but a need for such an adhesive that is pre-blended and can be easily carried and readily applied without a material reduction in storage stability or performance.

Unfortunately, a suitable solution to the problems associated with ease of installation, seal integrity and strength, has not been satisfactorily addressed by the prior art. Therefore, what is needed is an apparatus and a method for sealing cable splice closures with a low surface energy adhesive. It is also highly desirable to inject an adhesive for bonding the closure to the end seals and for bonding the end seals to the cable, and additionally providing apparatus to accomplish this so that re-entry into the closure does not disturb the seal integrity of the cable, end seal and closure.

SUMMARY OF THE INVENTION

The present invention accordingly, provides an apparatus and method for sealing cable splice closures with a low surface energy adhesive by injecting adhesive into the end seals. To this end, an end seal for a cable splice closure includes a seal having an opening for receiving a cable and has an adhesive injection port. The port is provided to communicate an adhesive injected into the port to bond surfaces of the end seal and the cable to be received, into a sealed unit.

A principal advantage of the present invention is that the end seal closure system permits sealing of various diameter cables for new construction and existing applications. This system also allows for reentry of the closure without disturbing the end seals. The bond strength of the adhesive at the end seal port area is improved to where the strength of the bond is substantially the same as the strength of the original material. This is in contrast to prior art devices which required extra hardware to allow for tension, flexing and vibration.

BRIEF DESCRIPTION OF THE DRAWINGS

FIG. 1 is an isometric view illustrating an embodiment of a wrap-type end seal for use in accordance with the present invention.

FIG. 2 is a cross-sectional end view taken along the line 2—2 of FIG. 1.

FIG. 3 is an isometric view illustrating an embodiment of a wrap-type end seal enclosed about a cable in accordance with the present invention.

FIG. 4 is a cross-sectional side view illustrating an embodiment of a wrap-type end seal enclosed about a cable in accordance with the present invention.

FIG. 5 is an isometric view illustrating an embodiment of a cable splice closure for use with a wrap-type end seal in accordance with the present invention.

FIG. 6 is an isometric cut-away view illustrating an embodiment of a cable splice having cable ends extending through wrap-type end seals in accordance with the present invention.

FIG. 7 is an isometric cut-away view partially illustrating an embodiment of a cable splice closure in accordance with the present invention.

FIG. 8 is an isometric view illustrating an embodiment of a cable splice closure in accordance with the present invention.

FIG. 10 is an exploded view illustrating an embodiment of an end seal body in accordance with the present invention.

FIG. 11 is a cross-sectional side view illustrating an embodiment of an end seal in accordance with the present invention.

FIG. 12 is a cross-sectional view illustrating an embodiment of a closure flange in accordance with the present invention.

FIG. 13 is also a cross-sectional view illustrating an embodiment of a closure flange in accordance with the present invention.

FIG. 20 is an isometric view illustrating an embodiment of an end seal which is formed to include trimmable washers.

FIG. 21 is a view taken along the line 21—21 of FIG. 20.

FIG. 22 is an isometric view illustrating an embodiment of a cable splice closure including resistance wires for curing adhesive.

DESCRIPTION OF THE PREFERRED EMBODIMENT

Figure 9:
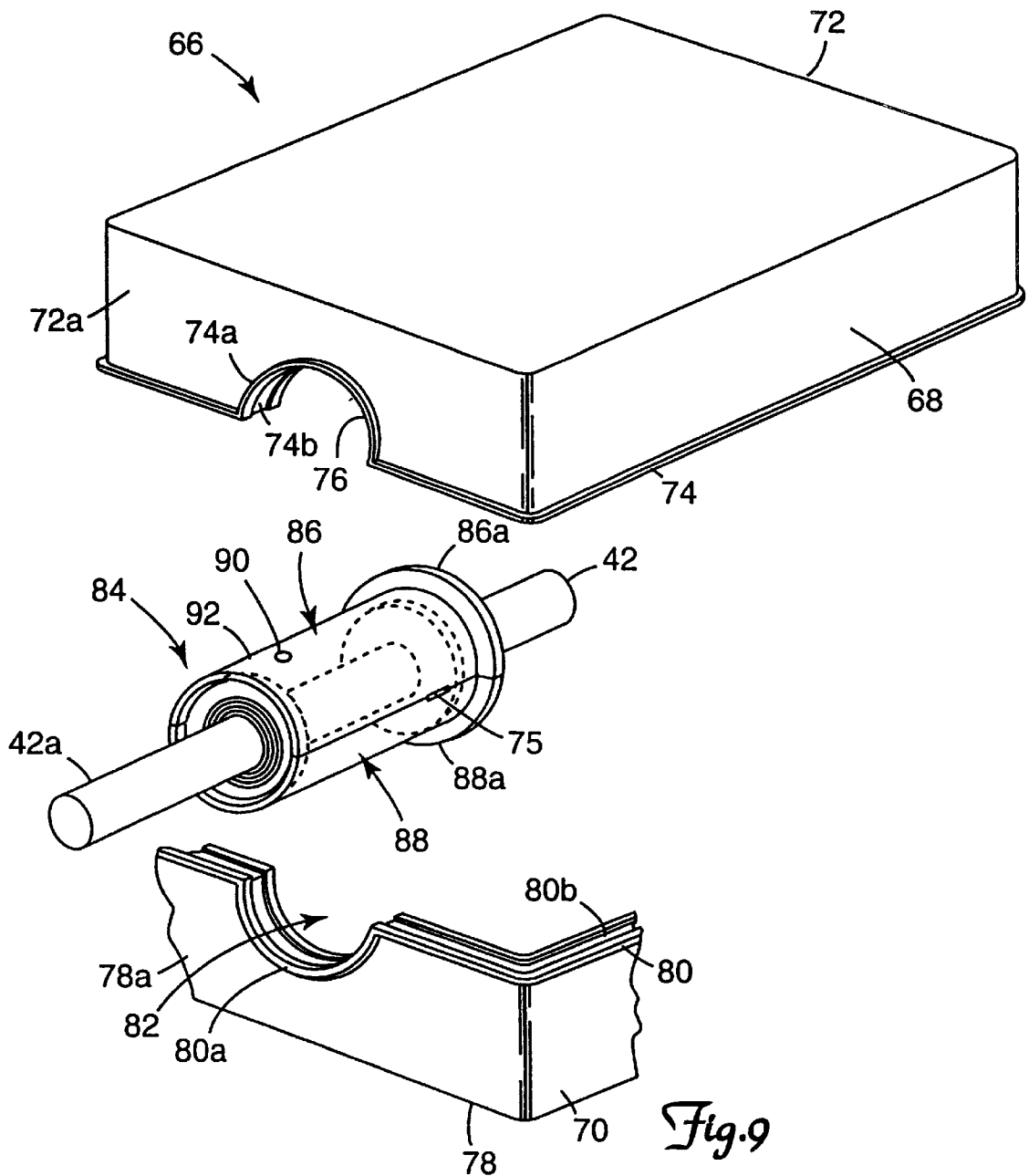
FIG. 9 is an exploded view partially illustrating an embodiment of a cable splice closure housing and end seal in accordance with the present invention.

Referring to FIG. 1, illustrated is an isometric view of an end seal generally designated 15 formed of a polyolefin elastomer material and comprising a body 18 including a core portion 20 and a tail portion 22. The core portion 20 is formed of a circular shape and has a plurality of openings 24 defined by areuate walls 25 which extend between a pair of opposed ends 26. The walls 25 begin and end at an outer peripheral surface 30 of the core portion 20 to form slot-like openings communicating with the openings 24 to permit the core portion 20 to receive endless cables or wires. An inner surface 32 of the tail portion 22 extends from one of the openings 24 generally tangential to the wall 25 and from a position at the slotted opening. The tail portion 22 has a generally uniform thickness and cross section along its length until near a free end 36 where its thickness begins to diminish or taper to a free edge to form a smooth transition to an outer surface 34 of itself after inner surface 32 is wrapped about the peripheral surface 30 of the core portion 20 and the exposed portion, if any, of a wire or cable disposed in each of the openings 24. An injection port 40 is provided in core portion 20.

Tail portion 22, FIG. 2, includes an adhesive groove 32a formed in an extending along inner surface 32 thereof. Also, tail portion 22 includes an adhesive groove 34a formed in and extending along outer surface 34 thereof. Also formed in outer surface 34 are a pair of cable tie slots 34b and 34c formed therein and extending therealong. The cable tie slots 34b and 34c respectively extend substantially parallel to and on opposite sides of adhesive groove 34a.

End seal 15, FIG. 3, includes a cable 42 extending through one of the openings 24. Openings 24 which are not needed for extending a cable therethrough, i.e., when there are fewer cables than openings, can be plugged as is well known, or can be made with a plug 27 therein so that the plug can be removed to expose the opening 24 when required for cable passage. End seal 15 is wrapped around cable 42 by wrapping tail portion 22 about core portion 20.

An injection port 40, FIGS. 3 and 4, is provided to communicate an adhesive 44, injected into body 18, to adhesive groove 32a to bond mating surfaces of end seal 15 and an outer surface 42a of cable 42 into a sealed unit. Thus, when tail portion 22 is wrapped around core portion 20 after insertion of cable 42, inner surface 32 of tail portion 22 engages surface 30 of core portion 20, and as tail portion 22 continues to be wrapped, inner surface 32 engages outer surface 34 of tail portion 22. Also, adhesive groove 32a is aligned with and overlays adhesive groove 34a so that adhesive communicated to groove 32a communicates to groove 34a, where grooves 34a, 32a overlay. However, on the outermost wrap of tail portion 22, groove 34a is not overlayed by groove 32a and thus outermost groove 34a does not receive adhesive in this manner. Injection of adhesive 44 into port 40 can be accomplished by a conventional applicator 46 containing a pre-mix of components comprising adhesive 44. Adhesive 44, as described herein, readily bonds with low surface energy plastics and is an acrylic monomer including organoborane amine complexes. Cable ties, not shown, can be engaged around cable tie slots 34b, 34c to maintain tail portion 22 wrapped around core portion 20 while adhesive 44 cures.

An elongated tubular cable splice closure housing 48, FIG. 5, is formed of a polyethylene material and includes a lengthwise slit 50 extending from a first end 48a to a second end 48b. A channel 52 extends substantially along the length of an outer surface 54 of housing 48, and includes a pair of right angle extensions 52a, 52b. Channel 52 includes an open face 56, revealed in the cut-away view in FIG. 7, along an inner surface 58 of housing 48, and also includes a pair of injection ports 60 communicating with channel 52 and with channel extensions 52a, 52b, not shown in FIG. 7. Housing 48 is diametrically adjustable by being radically compressed. As a result, a portion of outer surface 54 engages a portion of inner surface 58 adjacent slit 50, so that open face 56 of channel 52 is in abutment with outer surface 54 of housing 48.

A cable splice 62 formed in cable 42, FIG. 6, includes a pair of spaced apart end seals 15 as described above. Grooves 34a are exposed on outer surface 34 of tail portion 22. Closure housing 48 is mounted over cable splice 62, FIG. 8, such that ends 48a and 48b of closure housing 48 engage end seals 15. Adhesive 44 injected by applicator 46 into channel 52 via one of the ports 60, contacts surface 54 and flows into extensions 52a, 52b which are provided to communicate adhesive 44 into groove 34a. A pair of ties 64 can be tied around closure housing 48 to maintain closure housing 48 engaged with end seals 15 while adhesive 44 cures.

A cable splice closure, FIG. 9, includes a closure body 66 having an upper portion 68 and a lower portion 70, each being symmetrically formed. Upper portion 68 includes a generally rectangular housing portion 72 having a continuous flange 74. A semi-circular opening 76 formed at opposite ends of housing portion 72, but only shown at end 72a, includes an arc-like portion 74a of continuous flange 74. Similarly, lower portion 70 is generally rectangular but is only partially shown. Lower portion 70 includes a generally rectangular housing portion 78 having a continuous flange 80. A semicircular opening 82 formed at opposite ends of housing portion 78, but only shown at end 78a, includes an arc-like portion 80a of continuous flange 80. Each flange, 74, 80, includes a continuous groove 74b, 80b, respectively. Flanges 74, 80 are provided to abut so that grooves 74b, 80b matingly engage when upper portion 68 is mounted together with lower portion 70 to form closure body 66. In this manner, a substantially circular opening is formed by the alignment of arc-like portions 74a, 80a when ends 72a, 78a are joined. Also, as stated above, a similar opening (not shown) is formed at an opposite end of body 66. Also, it should be understood that each opposite end may include a plurality of openings.

An end seal body 84, FIGS. 9 and 10, is partially mounted in upper portion 68 and partially mounted in lower portion 70 and includes an upper collar 86 and a lower collar 88. Each collar 86, 88 is substantially semi-circular and includes a respective flange 86a, 88a. Upper collar 86 also includes an injection port 90. When collars 86, 88 are joined, FIGS. 10, 11, they form a cylinder 91 having circular outer surface 92 and a circular inner surface 94 which defines a chamber 96 having opposed annular openings 98, 100. Each annular opening 98, 100 includes a trimmable sealing washer 102 mounted therein for enclosing chamber 96. Washer 102 includes a plurality of concentric rings selectively removable to accommodate various diameter cables to extend therethrough. Cable 42 may be extended through washers 102, which are spaced apart and seated in end seal body 84. Chamber 96 may be filled with adhesive 44 by means of applicator 46 via port 90. Upper portion 68 and lower portion 70, FIG. 9, may be sealed together by a gasket nested in mating grooves 74b, 80b. The adhesive 44 bonds the end seal collars 86, 88, washers 102 and cable 42 into a sealed unit. Also, the adhesive 44 bonds end seal body 84 within the opening formed by arc-like portions 74a, 80a due to an adhesive slot 75 permitting adhesive 44 to flow from chamber 96. This is due to the fact that adhesive 44 readily bonds with low surface energy plastics forming the cable closure body 66, the end seal body 84, washers 102 and outer surface 42a of cable 42.

Alternatively, upper portion 68 and lower portion 70 may be sealed together by a multiple seal closure, FIGS. 12 and 13. In this embodiment, flanges 74, 80 may include a dual channel adhesive groove to permit reentry into a closure body. This is accomplished by applying adhesive 44 in a first or outside groove 104 for bonding flanges 74, 80 together. When re-entry is needed, flanges 74, 80 can be trimmed at notches 106 thus removing the bonded portion of flanges 74, 80. When work is completed, adhesive 44 is applied in a second or inside groove 108 and flanges 74, 80 are again bonded together.

Figure 14:
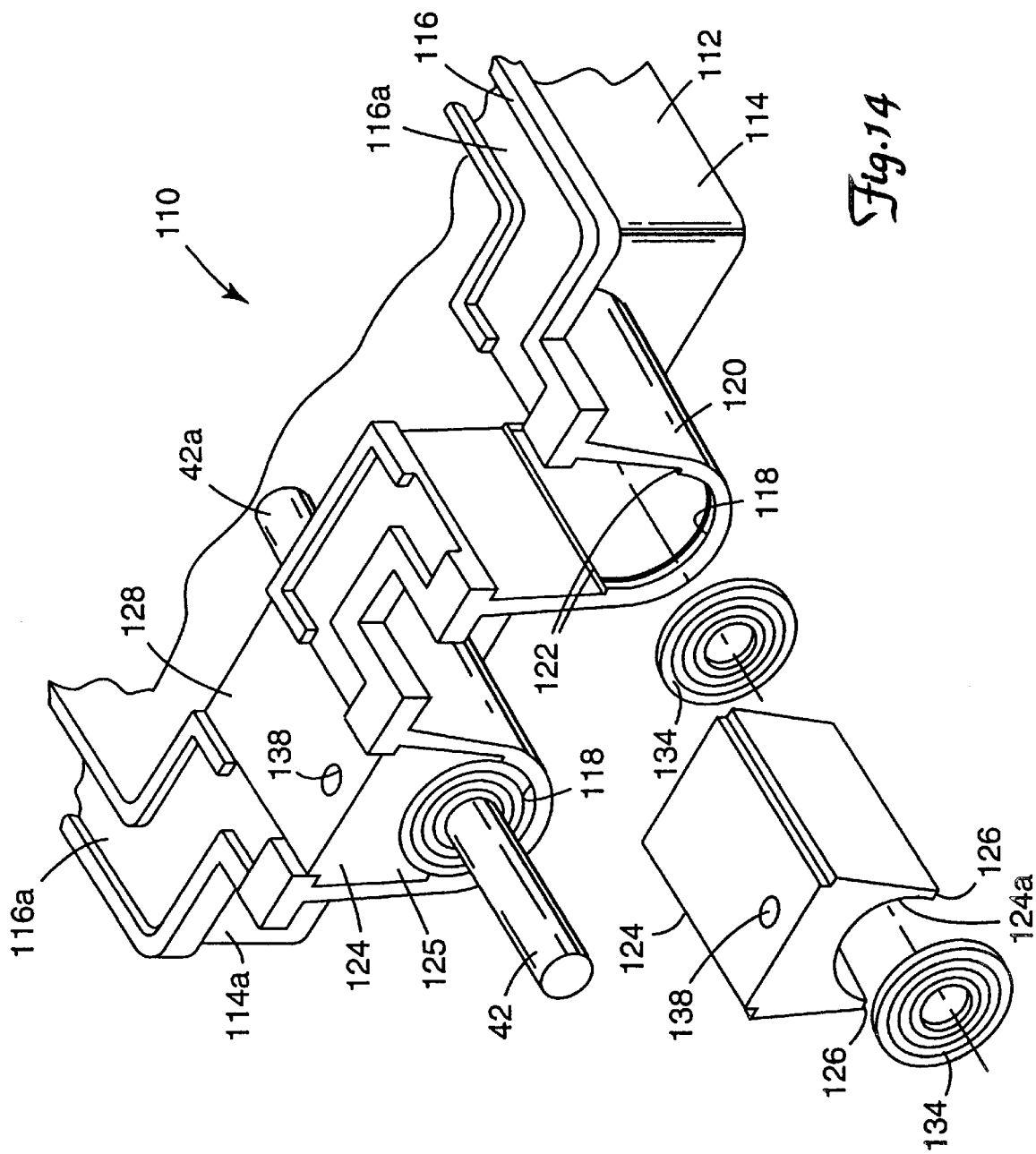
FIG. 14 is a partial exploded view illustrating an embodiment of a cable splice closure housing an end seal in accordance with the present invention.
Figure 15:
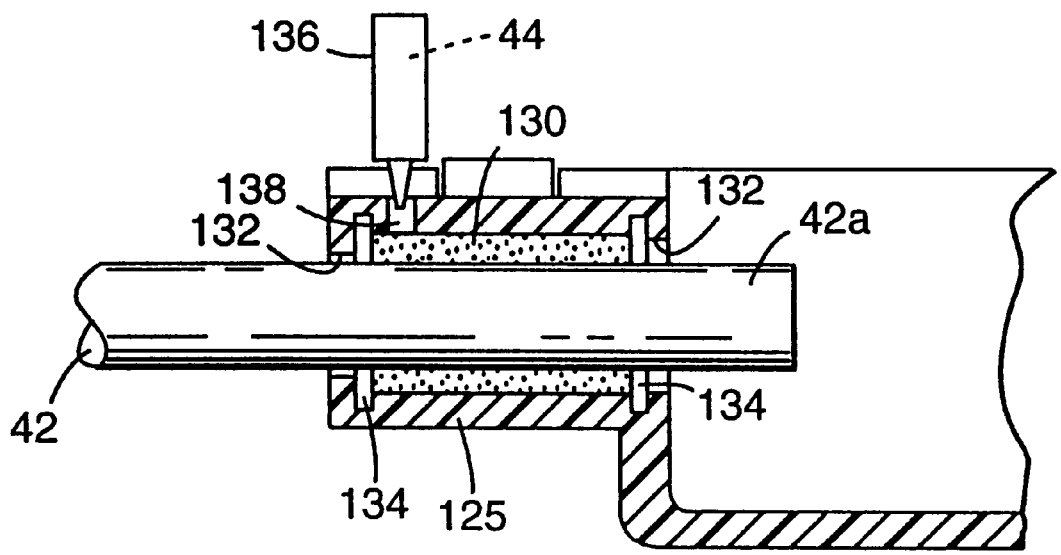
FIG. 15 is a partial cross-sectional side view illustrating an embodiment of an end seal in accordance with the present invention.

Another cable splice closure, FIGS. 14 and 15, includes a closure body 110 having an upper portion (not shown) and a lower portion 112. In the embodiment of FIG. 14, an opening or openings for cable end seals is only formed in the lower portion 112. Otherwise, the upper and lower portions of closure body 110 are substantially symmetrical. Lower portion 112 is generally rectangular but only partially shown. Lower portion 112 includes a generally rectangular housing portion 114 having a continuous flange 116. A pair of semi-circular openings 118 are formed at opposite ends of housing portion 114, but only shown at end 114a and each includes an arc-like portion 120 terminating at flange 116 and including a pair of spaced apart, parallel shoulders 122. A port block 124, includes a semi-circular arc-like portion 124a and a pair of spaced apart, parallel shoulders 126. Also, a planar face 128 of port block 124 is provided so that when port block 124 is seated opening 118 and shoulders 126 engage shoulders 122, planar face 128 is seated flush with a surface 116a of flange 116. The combination of port block 124 seated in opening 118 forms an end seal body 125 including cylindrical chamber 130, FIG. 15, having annular open ends 132. A pair of spaced apart trimmable washers 134, as previously described, are mounted in annular open ends 132 for enclosing chamber 130. Cable 42 may extend through washers 134 which are spaced apart and seated in end seal body 125. Chamber 130 may be filled with adhesive 44 by means of an applicator 136 via an adhesive injection port 138 formed in port block 124. Closure body 110 may be sealed closed by either gaskets or by adhesive 44 as mentioned above. The adhesive 44 bonds port block 124 in opening 118 along with washers 134 and cable 42 into a sealed unit. This is due to adhesive 44 readily bonding with the low surface energy plastics forming the cable closure body 110, the end seal body 125, washers 134 and the outer surface 42a of cable 42.

Figure 16:
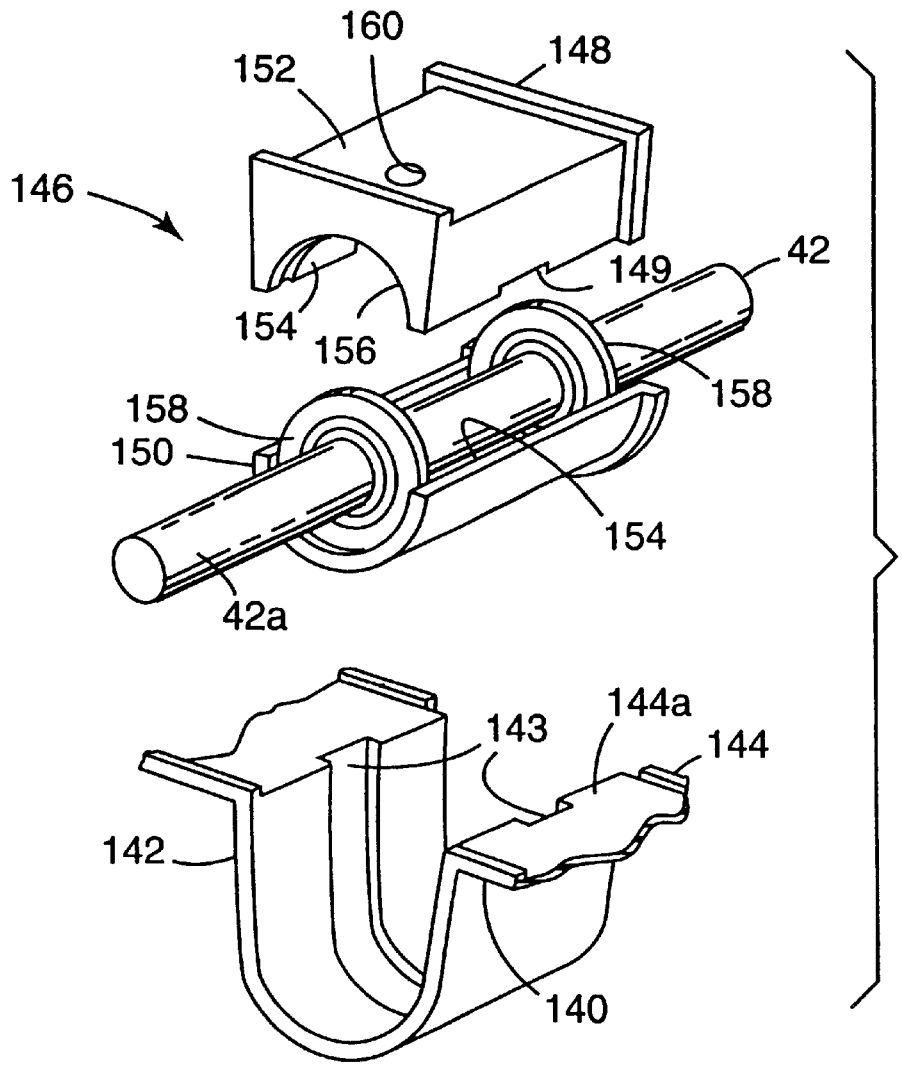
FIG. 16. is an exploded view illustrating an embodiment of an end seal body in accordance with the present invention.
Figure 17:
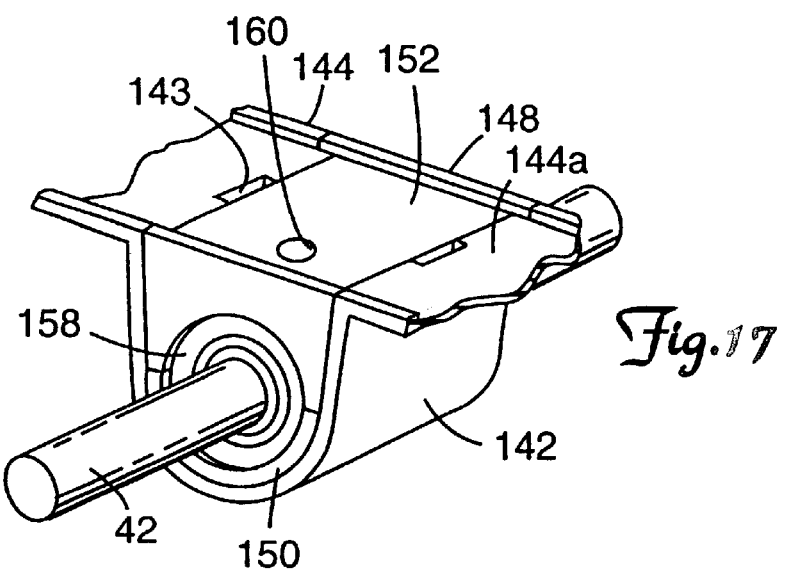
FIG. 17 is an isometric view illustrating an embodiment of an end seal body in accordance with the present invention.

Another end seal, FIG. 16, to be used with a lower portion 140 of a cable closure body is mounted in an arc-like semicircular opening 142, including an adhesive slot 143, adjacent a flange 144. In this embodiment, an end seal body 146 includes an upper portion 148 and a lower portion 150. Upper portion 148 includes an adhesive slot 149 which communicates adhesive to slot 143. A planar face 152 of upper portion 148 is provided so that when end seal body 146 is seated in semi-circular opening 142, FIG. 17, planar face 152 is seated flush with a surface 144a of flange 144.

The combination of end seal body 146 seated in semi-circular opening 142 forms a cylindrical chamber 154, FIG. 16, having annular open ends 156. A pair of spaced apart trmmable washers 158, as previously described, are mounted in annular open ends 156 for enclosing chamber 154. Cable 42 may extend through washers 158 which are spaced apart and seated in end seal body 146. Chamber 154 may be filled with adhesive 44 via an adhesive injection port 160 formed in upper portion 148. An upper portion (not shown) of the cable closure body may be sealed closed with lower portion 140 by either gaskets or by adhesive 44 as mentioned above. The adhesive 44 bonds upper portion 148 and lower portion 150 of end seal body 146 in semicircular opening 142 along with washers 158 and cable 42 into a sealed unit. This is due to adhesive 44 readily bonding with low surface energy plastics forming the cable closure body portion 140, the end seal body 146, washers 158 and the outer surface 42a of cable 42.

Figure 19:
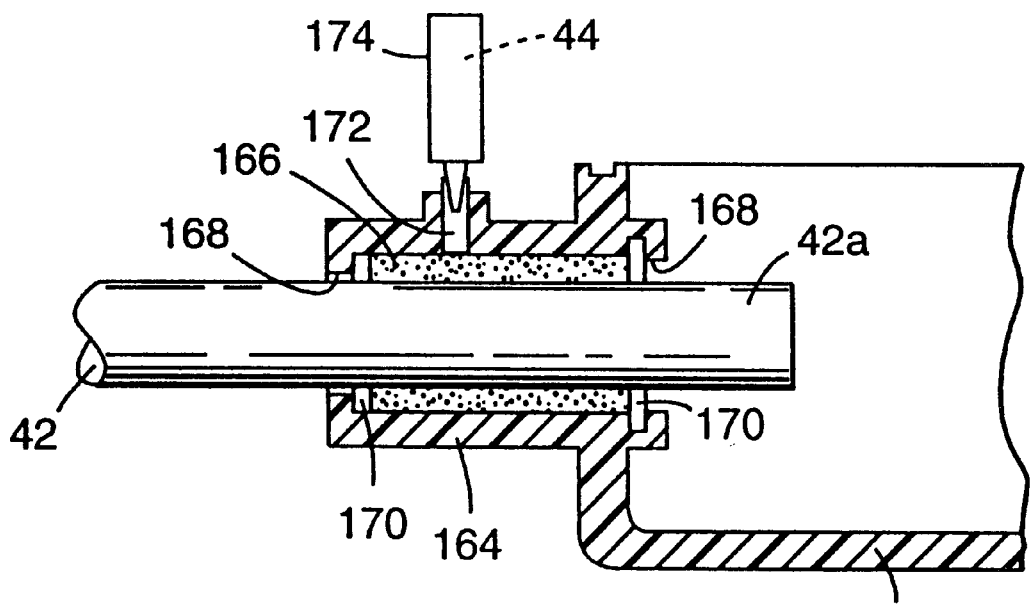
FIG. 19 is a cross-sectional side view illustrating an embodiment of an end seal in accordance with the present invention.
Figure 18:
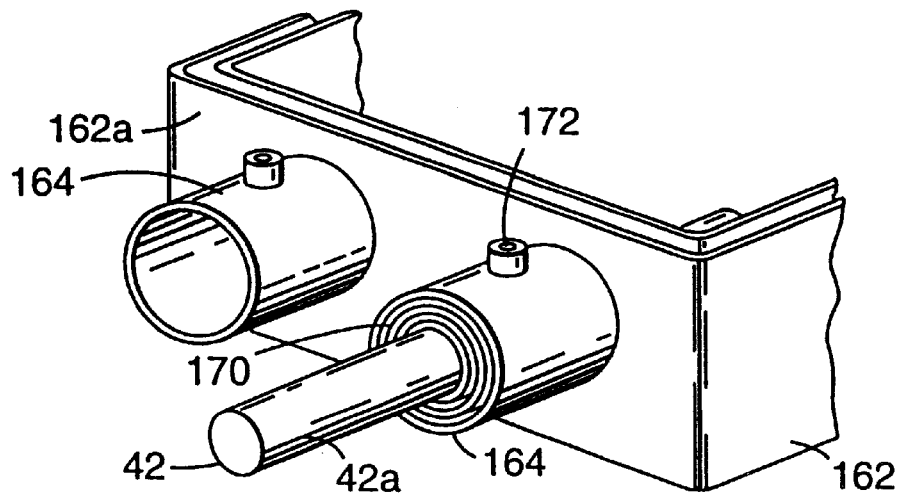
FIG. 18 is a partial isometric view illustrating an embodiment of a closure housing and end seal in accordance with the present invention.

A further end seal, FIG. 18, to be used with a lower portion 162 of a cable closure body includes cylindrical end seal body 164 formed with one end 162a of lower portion 162. Also, a similar end seal body, not shown, is formed at an opposite end of lower portion 162. Cylindrical end seal body 164 forms a cylindrical chamber 166, FIG. 19, having annular open ends 168. A pair of spaced apart trimmable washers 170, as previously described, are mounted in annular open ends 168 for enclosing chamber 166. Cable 42 may extend through washers 170 which are spaced apart and seated in end seal body 164. Chamber 166 may be filled with adhesive 44 via an adhesive injection port 172 formed in cylindrical body 164 by means of an applicator 174. An upper portion (not shown) of the cable closure body may be sealed closed with lower portion 162 by either gaskets or by adhesive 44 as mentioned above. The adhesive injected into port 172 bonds washers 170 and cable 42 into a sealed unit. This is due to adhesive 44 rapidly bonding with low surface energy plastics forming the cable closure body portion 162, the washers 170 and outer surface 42a of cable 42.

Another end seal body 180, FIG. 20 combines a trimmable washer 182 and an adhesive injection port 184. Washer 182 includes an outer body housing 186 which is cylindrical. A plurality of trimmable concentric washer rings 182a, 182b and 182c extend from a core 188 and are selectively removable to receive cable 42 therethrough. A selected washer ring is removed to match the diameter of the cable to be received. Injection port 184 extends from an outer body housing 186 and through each of the rings 182a, 182b and 182c extending from core 188. As it can be seen in FIG. 21, a pair of spaced apart sealing washers 190 of a size sufficient to engage outer surface 42a of cable 42 and also engage an inner diameter 192 of ring 182c. In this manner, adhesive 44 introduced into port 184 flows into a chamber 194 defined by cable 42, washers 190 and inner diameter 192 of ring 182c. The adhesive so introduced, bonds end seal body 180, cable 42 and washers 190 into a sealed unit. This is due to adhesive 44 rapidly bonding with low surface energy plastics forming the end seal body 180, washers 190 and outer surface 42a of cable 42. An end seal body such as that designated 180 could, for example, be sealed with adhesive 44 in a cylindrical chamber similar to the chamber designated 166 in FIG. 19.

The use of adhesives in the utility and communications industries has not been widely accepted, primarily due to the slow cure of adhesives at cold temperatures. To effectively address this issue, the concept of a resistive heating element 200, FIG. 22, in conjunction with adhesive 44 has been developed. This concept involves the use of resistive heating element 200, powered by a portable energy source to assist in curing a bead of adhesive 44 set on a mating surface 202 of a mating flange 204 of one-half portion of a cable splice closure body 206, the other half portion of the closure body 206 not being shown. This is similar to the configuration shown in FIGS. 12 and 13. The adhesive 44, FIG. 22, and heating element 200 may be extended along semi-circular portions 208 of flange 204 for sealing cables therein. Thus, when both portions of body 206 are mated and sealed together at flange 204, cables can also be sealed in portions 208 of closure body 206. In theory, any form of resistive heating element 200 may be used to aid in curing adhesive 44 by embedding the element 200 into the flange 204, on the surface 202 of flange 204 or into adhesive bead 44. Using a direct current (DC) power supply (not shown) and nichrome based heating element 200, curing of adhesive 44 can be enhanced.

Figure 23:
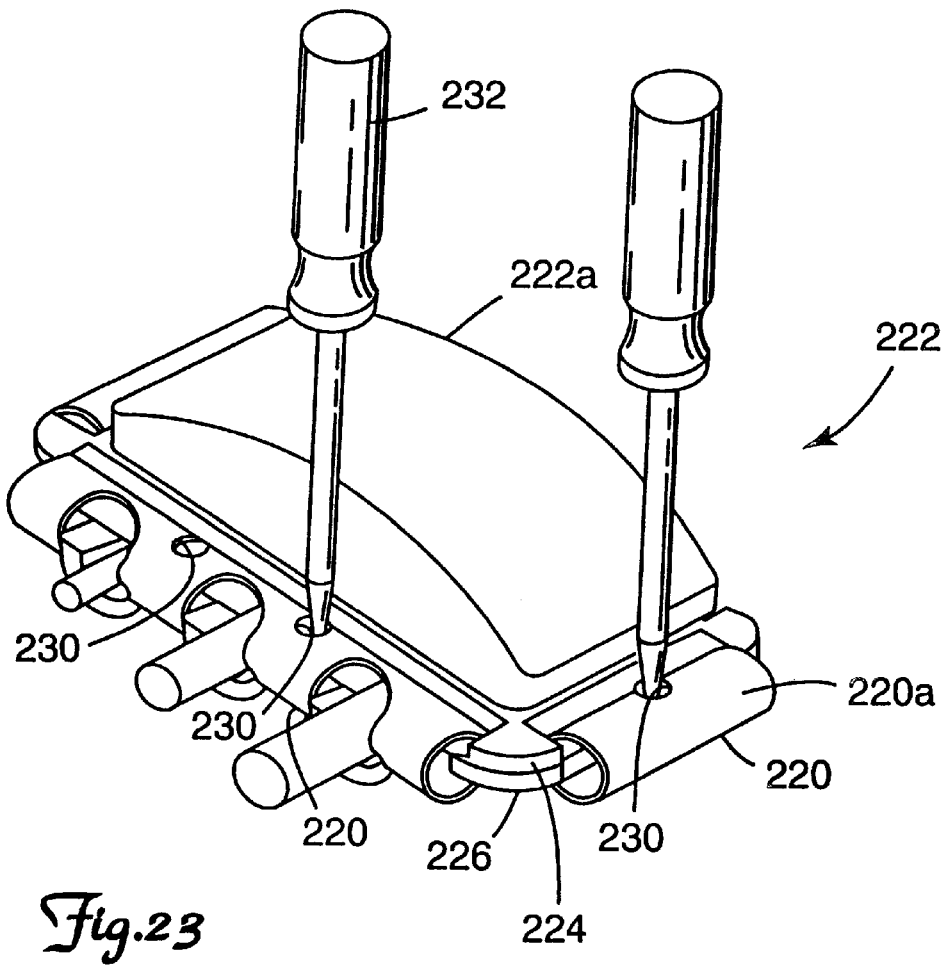
FIG. 23 is an isometric view illustrating an embodiment of a cable splice closure including spring clips mounted on the flanges.
Figure 24:
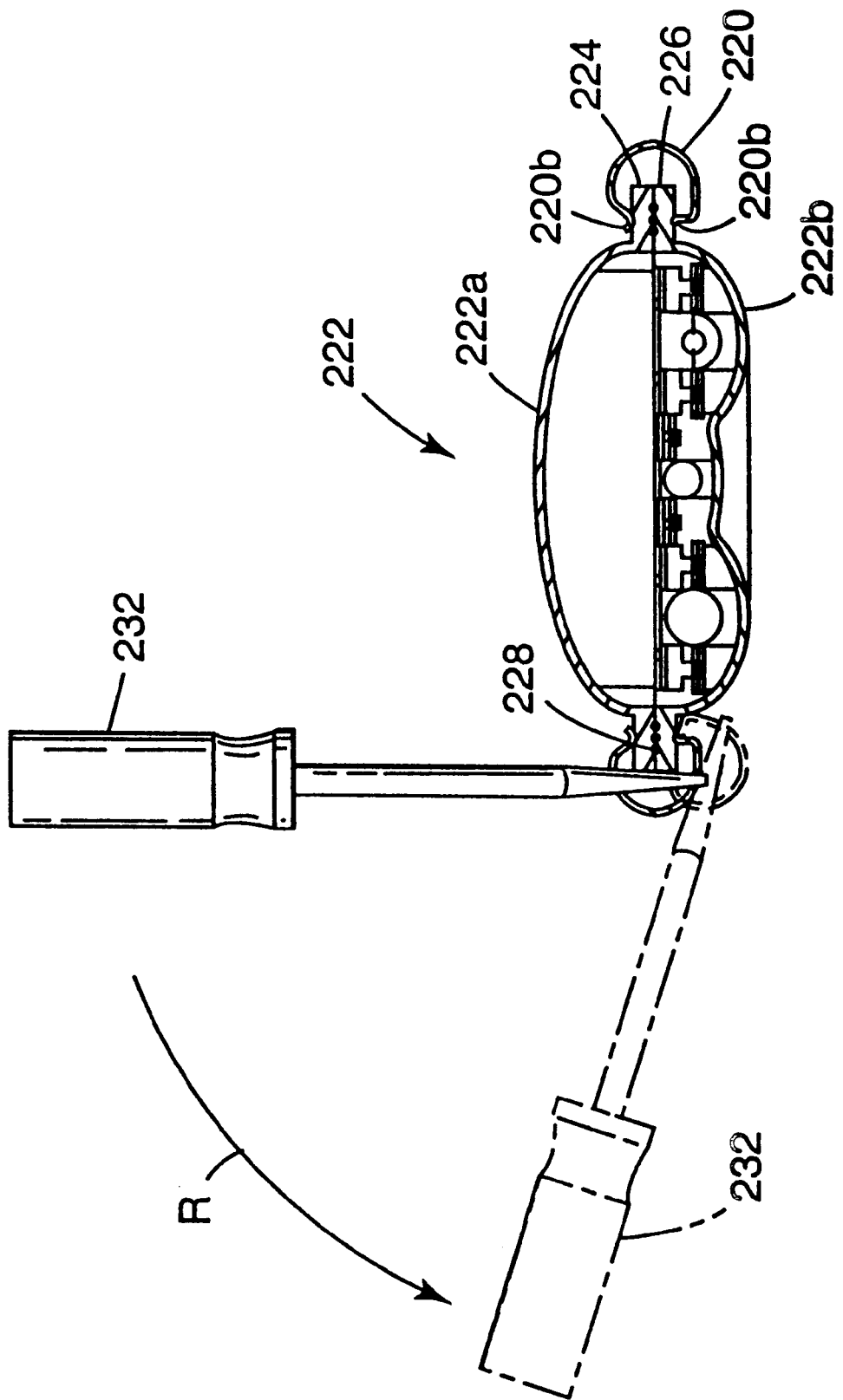
FIG. 24 is a cross-sectional end view illustrating the use of a tool to remove the spring clips.

As was mentioned previously, gaskets are often used to seal a joint between closure body halves. This is accomplished by inserting a gasket between mating flanges of such a closure. Sealing is critical since the closures are often used in hostile environments subject to moisture and other contamination. Thus, an airtight and a water tight seal is critical. Gasket seals are common for easy re-entry splice closures. Such re-entry is intended not to disturb existing cables. Such closures are often sealed with mastic or a one-piece perimeter gasket. Fasteners are often used which pass through the flanges. Special tools or wrenches are often required for re-entry. According to FIGS. 23 and 24, resilient spring clips 220 can be used as quick release clamping devices for cable closures. A closure body 222 includes upper portion 222a and lower portion 222b, sealingly engaged at mating flanges 224, 226. A sealing gasket 228, FIG. 24, is compressed between flanges 224, 226. Spring clips 220 include an arcuate portion 220a terminating at ends 220b which clamp onto flanges 224, 226 and urge the flanges toward each other to sealingly compress gasket 228 therebetween. When removal of clips 220 is required, a plurality of openings 230 in clips 220 provide for a simple tool 232 such as a screwdriver, to be inserted thereinto and engaged with flanges 224, 226. A rotation of tool 232, FIG. 24, in a direction indicated by an arrow designated R, urges clip 220 out of engagement with flanges 224, 226. The clips 220 are also useful to relieve excess pressure during flash testing, which is a process to determine if there have been any leaks created during assembly of the closure.

Material selection for the end seals and cable closures of the present invention requires good bonding capabilities to provide proper sealing as well as providing resistance to contamination, moisture and pressure. Bonding of surfaces to be sealed involves bonding of adhesive 44 to polyethylene cable jackets and to end seal bodies, cable closure bodies and trimmable washers which may be used. As such, polyolefin elastomers are suitable materials for the washers, end seal bodies and cable closure bodies, and of that group, the flexible ethylene alphaolefin copolymer sold under the name ENGAGE by the Dow Chemical of Midland, Mich. is preferred.

Material selection for the adhesive 44 utilizes polymerizable acrylic compositions that incorporate polymerization initiator systems based on organoborane amine complexes. The compositions are particularly usefil as sealants and/or encapsulants for use with splice enclosures and the like, especially those which are manufactured from low surface energy materials (e.g. polyethylene, polypropylene, polytetrafluoroethylene, etc.) or which are used with cables sheathed with such materials.

Broadly, the polymerizable compositions comprise a polymerization initiator system and at least one acrylic monomer capable of free radical polymerization. The polymerization initiator systems comprise organoborane amine complex and a material that is reactive with the amine for liberating the organoborane. The organoborane component of the complex initiates free radical polymerzation of acrylic monomer to form an acrylic polymer that can be useful as a sealant or encapsulant. To stabilize the organoborane against premature oxidation, it is complexed with amine. The organoborane is liberated from the complex by reacting the amine portion of the complex with the amine-reactive material.

Useful organoborane amine complexes may be readily prepared using known techniques and preferably have the following general structure:

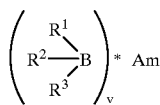

where R1 is an alkyl group having 1 to 10 carbon atoms, and R2 and R3 are independently selected from alkyl groups having 1 to 10 carbon atoms and phenyl-containing groups. More preferably, R1, R2 and R3 are alkyl groups having 1 to 5 carbon atoms such as methyl, ethyl, propyl, iso-propyl, n-butyl, iso-butyl, and pentyl. Most preferred are complexes in which R1, R2 and R3 are each ethyl groups.

The value of v is selected so as to provide an effective ratio of primary amine nitrogen atoms to boron atoms in the complex. The primary amine nitrogen atom to boron atom ratio in the complex is broadly about 1:1 to 4:1. Preferably, however, the ratio is about 1:1 to 2:1, more preferably about 1:1 to 1.5:1, and most preferably about 1:1. A primary amine nitrogen atom to boron atom ratio of less than 1:1 could leave free organoborane, a material that tends to be pyrophoric. At primary amine nitrogen atom to boron atom ratios in excess of 2:1, the practical utility of the complex diminishes as the amount of complex that must be employed becomes larger.

"Am" represents the amine portion of the complex and may be provided by a wide variety of materials having at least one amine group, including blends of different amines. More preferably, "Am" is a polyamine (a material having two or more amine groups). While polyamines having two to four amine groups are especially preferred, polyamines with two amine groups (i.e., diamines) are most preferred.

"Am" may be a primary or secondary monoamine, such as those represented by the structure:

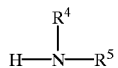

wherein R4 and R5 are independently selected from the group consisting of hydrogen and alkyl groups having 1 to 10 carbon atoms, and alkylaryl groups in which the amine group is not directly attached to the aryl structure. Particular examples of these amines include ammonia, ethylamine, butylamine, hexylamine, octylamine, and benzylamine.

The amine may also be a polyamine such as those described by the structure H2N-R6-NH2 in which R6 is a divalent, organic radical comprised of an alkyl, aryl or alkylaryl group. Preferred among these materials are alkane diamines which may be branched or linear, and having the general structure:

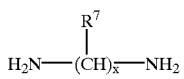

in which x is a whole number greater than or equal to 1, more preferably about 2 to 12, and R7 is hydrogen or an alkyl group, preferably methyl. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentanediamine, 3-methyl-1,5-pentanediamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes may be selected from the following structures:

H2NR8(R9O)w-(R10O)x-(R9O)y-R8NH2

(i.e., polyoxyalkylene diamines); or

[H2NR8-(R9O)w]z-R11.

R8, R9 and R10 are alkylene groups having 1 to 10 carbon atoms and may be the same or may be different. Preferably, R8 is an alkyl group having 2 to 4 carbon atoms such as ethyl, n-propyl, iso-propyl, n-butyl or iso-butyl. Preferably, R9 and R10 are alkyl groups having 2 or 3 carbon atoms such as ethyl, n-propyl or isopropyl. R11 is the residue of a polyol used to prepare the polyoxyalkylenepolyamine (i.e., the organic structure that remains if the hydroxyl groups are removed.) R11 may be branched or linear, and substituted or unsubstituted (although substituents should not interfere with oxyalkylation reactions).

The value of w is ≧1, more preferably about 1 to 150, and most preferably about 1 to 20. Structures in which w is 2, 3 or 4 are useful too. the value of x and y are both ≧0. The value of z is >2, more preferably 3 or 4 (so as to provide, respectively, polyoxyalkrlene triamines and tetraamines). For the polyoxyalkylene, molecular weights of less than about 5,000 may be used, although molecular weights of about 1,000 or less are more preferred, and molecular weights of about 250 to 1,000 are most preferred.

Examples of particularly preferred polyoxyalkylenepolyamines include polyethyleneoxidediamine, polypropyleneoxidediamine, polypropyleneoxidetriamine, diethyieneglycolpropylenediamine, triethyleneglycolpropylenediamine, polytetramethyleneoxidediamine, polyethyleneoxide-co-polypropyleneoxidediamine, and polyethyleneoxide-co-polypropyleneoxidetriamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

The polyamine may also comprise the condensation reaction product of diprimary amine-terminated material (i.e., the two terminal groups are primary amine) and one or more materials containing at least two groups reactive with primary amine (referred to herein at times as "difunctional primary amine-reactive material"). Such materials are preferably substantially linear so as to have the following general structure E-(L-E)u-L-E in which each E is the residue of the diprimary amine-terminated material and each L is a linking group that is the residue of the difunctional primary amine-reactive material. (By "residue" is meant those portions of the diprimary amine-terminated material and the difunctional primary amine-reactive material that remain after reaction to form the polyamine adduct.) The E and L groups are independently selected. The majority (more than 50%) of the terminal groups in the polyamine should be primary amine. Consequently, the value of u may be greater than or equal to zero, although a value of about 0 to 5 is more preferred, and a value of 0 or 1 is most preferred.

The diprimary amine-terminated material may be alkyl diprimary amine, aryl diprimary amine, alkylaryl diprimary amine, a polyoxyalkylenediamine (such as those described above), or mixtures thereof. Useful alkyl diprimary amines include those having the structure NH2-R12-NH2 wherein R12 is a linear or branched alkyl group having about 1 to 12 carbon atoms such as 1,3-propane diamine, 1,6hexanediamine, and 1,12-dodecanediamine. Other useful alkyl diprimary amines include triethylene tetraamine and diethylene triamine. Examples of useful aryl diprimary amines include 1,3- and 1,4-phenylene diamine as well as the various isomers of diaminonaphthalene. An example of a useful alkylaryl diprimary amine is m-tetramethylxylene diamine.

Difunctional primary amine-reactive materials used to prepare the polyamine contain at least two groups reactive with primary amine. The reactive groups may be different, but it is preferred that they be the same. Difunctional primary amine-reactive materials having a functionality of 2 (i.e., two groups reactive with primary amine) are preferred. Useful difunctional primary amine-reactive materials may be generally represented by the formula Y-R13-Z wherein R13 is a divalent organic radical such as an alkyl, aryl or alkylaryl group or combination thereof, and Y and Z are groups reactive with primary amine and which may be the same or may be different. Examples of useful Y and Z groups reactive with primary amine include carboxylic acid (—COOH), carboxylic acid halide (—COX, where X is a halogen, for example chlorine), ester (—COOR), aldehyde (—COH), epoxide

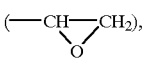

amine alcohol (—NHCH20H), and acrylic.

Suitable carboxylic acid-functional materials are preferably those which are useful in forming polyamides, for example, cyclohexane-1,4-dicarboxylic acid and dicarboxylic acids having the structure HOOC-R14-COOH in which R14 is a linear alkyl group having about 2 to 21 carbon atoms. Aromatic dicarboxylic acids (e.g., terephthalic and isophthalic acids) may be used as can alkylaryl dicarboxylic acids, especially in combination with alkyl dicarboxylic acids. Useful carboxylic acid halide-functional materials and ester-functional materials include those which are obtained by derivatizing the above-described carboxylic acid-functional materials. Suitable aldehyde-functional materials include alkyl, aryl and alkylaryl dialdehydes such as oxaldehyde propanedialdehyde, succinaldehyde, adipaldehyde, 2-hydroxyhexanedial, phthalaldehyde, 1,4, benzenediacetaldehyde, 4,4(ethylenedioxy) dibenzaldehyde, and 2,6-naphthalene dicarbaldehyde. Most preferred are glutaraldehyde and adipaldehyde. Suitable epoxide-functional materials include aliphatic, cycloaliphatic and glycidyl ether diepoxides. Most preferred are the diepoxides based upon bis-phenol A and bis-phenol F. Useful acrylic-functional materials are preferably diacrylates and a wide variety of such materials may be successfully employed.

The organoborane amine complex is employed in an effective amount, which is an amount large enough to permit acrylic monomer polymerization to readily occur to obtain an acrylic polymer of high enough molecular weight for the desired end use but without polymerization proceeding too rapidly to allow for effective mixing and use of the resulting composition. Within these parameters, an effective amount of the organoborane amine complex is an amount that preferably provides about 0.03 to 1.5 weight % boron, more preferably about 0.08 to 0.5 weight % boron, most preferably and about 0.1 to 0.3 weight % boron. The weight % of boron in a composition is based on the total weight of the composition, less fillers, non-reactive diluents, and other non-reactive materials.

As noted above, the organoborane amine complexes of the invention are especially useful for initiating the polymerization of acrylic monomers. The polymerization initiator system comprises an effective amount of the organoborane amine complex and an effective amount of a compound that is reactive with amine for liberating organoborane so as to initiate polymerization. A wide variety of materials may be used to provide the amine reactive compound. Desirable amine reactive compounds are those materials that can readily form reaction products with amines at or below (and, more preferably, at) room temperature (about 20° to 22° C.) so as to provide a composition that can be easily used and cured under ambient conditions. General classes of useful amine reactive compounds include acids, anhydrides and aldehydes. Isocyanate, acid chloride, sulfonyl chloride, and the like such as isophorone diisoyanate, toluene diisocyanate and methacryloyl chloride may also be used but are less preferred because they require scrupulous drying of monomer mixtures containing these ingredients so as to preclude undesirable, premature reaction with moisture.

Acids are a preferred amine reactive compound. Any acid that can liberate the organoborane by salting the amine group may be employed. Useful acids include Lewis acids (e.g., SnC14, TiC14 and the like) and Bronsted acids such as those having the general formula R18-COOH, where R18 is hydrogen, an alkenyl group of 1 to 8 and preferably 1 to 4 carbon atoms, or an aryl group of 6 to 10, preferably 6 to 8 carbon atoms. The alkenyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid. Other useful Bronsted acids include Hcl, H2SO4, H3PO4, phosphoric acid, phosphinic acid, silicic acid, and the like.

Also preferred as the amine reactive compound are materials having at least one anhydride group, such materials preferably having one of the following structures:

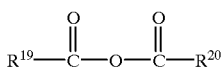

or

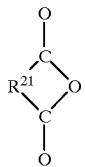

R19 and R20 are organic radicals which independently may be aliphatic, including straight- and branched-chain arrangements that may be saturated or unsaturated, cycloaliphatic, or aromatic. Preferred aliphatic groups comprise 1 to 17 carbon atoms, more preferably 2 to 9 carbon atoms. Preferred aromatic groups include benzene which may be substituted with 1 to 4 carbon atom aliphatic groups.

R21 is a divalent organic radical that completes a cyclic structure with the anhydride group to form, for example, a 5 or 6-membered ring. R21 may be substituted with aliphatic, cycloaliphatic or aromatic groups, preferably aliphatic groups comprising 1 to 12, more preferably 1 to 4 carbon atoms. R21 may also contain heteroatoms such as oxygen or nitrogen provided that any heteroatom is not adjacent to the anhydride functionality. R21 may also be part of a cycloaliphatic or aromatic fused ring structure, either of which may be optionally substituted with aliphatic groups. The presence of a free-radically polymerizable group in the anhydride-functional amine reactive compound may permit the same to polymerize with the acrylic monomers.

Aldehydes useful as the amine-reactive compound have the formula: R22-(CHO)x where R22 is an alkyl group of 1 to 10 carbon atoms, preferably 1 to 4, or an aryl group having 6 to 10 carbon atoms, preferably 6 to 8, and x is 1 to 2, preferably 1. In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred R22 group is aryl. Illustrative examples of compounds of this type include, benzaldehyde, o-, m- and p-nitrobenzaldehyde, 2,4-dichlorobenzaldehyde, p-tolylaldehyde and 3-methoxy-4-hydroxybenzaldehyde. Blocked aldehydes such as acetals may aso be used.

The amine reactive compound is employed in an effective amount; that is, an amount effective to promote polymerization by liberating organoborane from the complex, but without materially adversely affecting the properties of the ultimate polymerized composition (e.g., adhesion to low energy surfaces). Within these parameters, the amine reactive compound may be provided in an amount wherein the number of amine groups in the organoborane amine complex. However, it is much more preferred that the number of equivalents of amine reactive groups be stoichiometric with the number of amine groups in the organoborane amine complex.

As noted before, the organoborane amine complex initiator systems are used to polymerize acrylic monomers. By "acrylic monomer" is meant polymerizable monomers having one or more acrylic or substituted acrylic moieties, chemical groups or functionality; that is, groups having the general structure:

H2C=C—C—O—R' wherein R is hydrogen or an organic radical and R' is an organic radical. Where R and R' are organic radicals, they may be the same or they may be different. Blends of acrylic monomers may also be used. The polymerizable acrylic monomer may be monofunctional, polyfunctional or a combination thereof.

The most useful mononers are monofunctional acrylate and methacrylate esters and substituted derivatives thereof such as hydroxy, amide, cyano, chloro, and silane derivatives as well as blends of substituted and unsubstituted monofunctional acrylate and methacrylate esters. Particularly preferred monomers include lower molecular weight methacrylate esters such as methyl methacrylate, ethyl methacrylate, methoxy ethyl methacrylate, hydroxyethyl methacrylate, hydropropyl methacrylate, cyclohexyl methacrylate, tetrahydrofurfuryl methacrylate, and blends thereof.

Both acrylate esters and higher molecular weight methacrylate esters are less preferred for use alone, but can be especially usefully employed as modifying monomers with predominating amounts of lower molecular weight methacrylate esters so as to, for example, enhance the softness or flexibility of the ultimate composition. Examples of such acrylate esters and higher molecular weight methacrylate esters include methyl acrylate, ethyl acrylate, isobornyl methacrylate, hydroxypropyl acrylate, butyl acrylate, n-octyl acrylate, 2-ethylhexyl acrylate, 2-ethylhexyl methacrylate, decyl methacrylate, dodecyl methacrylate, tert-butyl methacrylate, acrylamide, N-methyl acrylamide, diacetone acrylamide, N-tert-butyl acrylamide, N-tert-octyl acrylide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

Another class of polymerizable monomers that are especially useful as modifiers correspond to the general formula:

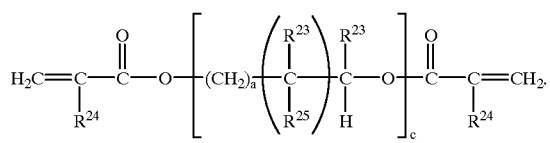

$R23$ may be selected from the group consisting of hydrogen methyl, ethyl, and

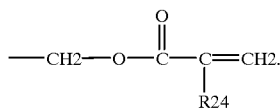

$R24$ may be selected from the group consisting of hydrogen, chlorine, methyl and ethyl. $R25$ may be selected from the group consisting of hydrogen, and

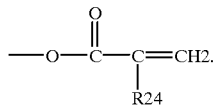

The value of a is an integer greater than or equal to 1, more preferably, from 1 to about 8, and most preferably from 1 to 4. The integral value of b is greater than or equal to 1, more preferably, from 1 to about 20. The value of c is 0 or 1. Other acrylic monomers useful as modifying monomers, include ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates. Also useful are dimethacrylate of bis (ethylene glycol) adipate, dimethacrylate of bis(ethylene glycol) maleate, dimethacrylate of bis(ethylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to the dimethacrylates, and the like. Other useful acrylic monomers include the reaction product of mono- or polyisocyanates, for example, toluene diisocyanate, with an acrylate ester containing a hydroxy or an amino groups in the non-acrylate portion thereof, for example, hydroxyethyl methacrylate.

The compositions may further comprise a variety of optional additives such as thickeners, elastomeric materials (e.g., graft copolymer resins), acrylic crosslinking agents, peroxides, inhibitors such as hydroquinone, non-reactive colorants, fillers (e.g., carbon black), etc. The various optional additives are employed in an amount that does not significantly adversely affect the polymerization process or the desired properties of compositions made therewith.

The organoborane amine complex may be carried by (e.g., dissolved in or diluted by) and aziridine-functional material or a blend of two or more different aziridine-functional materials. The aziridine-functional material should not be reactive toward, coordinate or complex the amine portion of the complex and functions as an extender for the complex. The aziridine-functional material may also function as a reactive extender if the composition includes an ingredient that undergoes a ring-opening reaction with the aziridine functionality so as to permit the aziridine-functional material to react therewith or to polymerize with other constituents of the system. Advantageously, the amine reactive compound can also react with the aziridine-functional material so as to yield a 100% reactive system.

An "aziridine-functional material" refers to an organic compound having at least one aziridine ring or group,

the carbon atom(s) of which may be optionally substituted by short chain alkyl groups, e.g., groups having 1 to 10 carbon atoms and preferably methyl, ethyl or propyl, so as to form, for example methyl, ethyl or propyl aziridine moieties.

Mono-functional aziridines in which a single aziridine group is a substituent in an alkyl, aryl, alkylaryl, acyl, or aroryl radical (which optionally may be substituted with other moieties that do not react with the organoborane amine complex or the aziridine functionality such as amino and hydroxyl groups) may be employed. Particular examples of suitable mono-functional aziridines include N-ethyl aziridine, N-(2-cyanoethyl)aziridine, N-butyl aziridine, isobutyl aziridine, 2-aziridinyl ethanol, 1-aziridinyl ethanol, 1-iso-butyryl aziridine, and 1-butyryl aziridine.

While mono-functional aziridines are useful, polyfunctional aziridines (sometimes referred to herein as "polyaziridines"; i.e., having more than aziridine group) are more preferred as they can promote the in situ generation of a crosslinking agent. Of the various polyaziridines, those which are tri-functional are especially useful. Tris-aziridine and tris-methylaziridine of trimethylol propane triacrylate, and tris-aziridine and tris-methylaziridine of pentaerythritol triacrylate are particularly preferred. Examples of useful, commercially available polyaziridines include CX-100 (from Zeneca Resins), XAMA-7 (from EIT, Inc.), and MAPO (tris[1-(2-methyl) aziridinyl] phosphine oxide (from Aceto Corp).

The polymerizable compositions can be easily used as two-part compositions. The acrylic monomers are blended as would normally be done when working with such materials. The amine-reactive compound is usually included in this blend so as to separate it from the organoborane amine complex, thus providing one part of the two-part composition. The organoborane amine complex provides the second part of the composition. Advantageously, the two parts of the polymerizable composition are capable of being combined in a common, whole number mix ratio such as 10:1 or less, more preferably 1:4, 1:3, 1:2 or 1:1. The first and second parts are combined shortly before it is desired to use the composition.

The use of a low surface energy adhesive in the applications discussed herein offers many advantages. Easy re-entry to splice closure housings is an important feature and is realized by the clamp device disclosed herein. Also, in any closure which is gasket sealed for re-entry, the low surface energy end sealing disclosures herein permits re-entry without disrupting the cable end seals. The end seal closures described herein permit sealing of various cable diameters for new and existing construction using the same components. A smooth and uniform gasket sealing surface is provided. The bond strength of the adhesive at the end seal port area obviates the need for extra hardware for adding tensile, flexing and vibration strength. This reduces cost and assembly time. No torch or heat is required for assembly, so that the closure devices can be used in manholes, vaults and trenches.

Although illustrative embodiments of the invention have been shown and described, a wide range of modification, change and substitution is contemplated in the foregoing disclosure and in some instances, some features of the present invention may be employed without a corresponding use of other features. Accordingly, it is appropriate that the appended claims be construed broadly and in a manner consistent with the scope of the invention.

What is claimed is:

1. An end seal for a cable splice closure, comprising:
   a core portion having a slot therein, said slot being adapted to receive a cable;
   a tail portion, extending from said core portion, said tail portion being of sufficient length and flexibility to be extended over said slot; and
   an adhesive injection port in said core portion, said injection port being adapted to communicate an adhesive injected into said port to said slot,
   wherein said adhesive comprises an acrylic monomer and an organoborane amine complex.

2. The end seal of claim 1, wherein said core portion has an outer peripheral surface and spaced ends, and wherein said peripheral surface is provided with a plurality of slots that extend between said ends and are open along said peripheral surface to form apertures, each of said apertures being adapted to receive a cable.

3. The end seal of claim 2, wherein each of said slots has an essentially circular cross-section.

4. The end seal of claim 1, wherein said end seal comprises a low surface energy material.

5. The end seal of claim 1, wherein said tail portion is provided with a longitudinal groove.

6. The end seal of claim 5, wherein said groove is in open communication with said injection port.

7. The end seal of claim 1, wherein said slot comprises a plurality of trimmable concentric washers selectively removable to receive a cable therethrough.

8. The end seal of claim 7, wherein the injection port extends through each of said washers.

* * * * *